(12) United States Patent
Jackson et al.

(10) Patent No.: US 9,124,603 B2
(45) Date of Patent: Sep. 1, 2015

(54) METHODS AND APPARATUS TO SELECT A PEERED VOICE OVER INTERNET PROTOCOL (VOIP) BORDER ELEMENT

(75) Inventors: James Jackson, Austin, TX (US); Bernard Ku, Austin, TX (US); Mehrad Yasrebi, Austin, TX (US)

(73) Assignee: AT&T Intellectual Property I., L.P., Atlanta, GA (US)

( * ) Notice: Subject to any disclaimer, the term of this patent is extended or adjusted under 35 U.S.C. 154(b) by 1757 days.

(21) Appl. No.: 11/845,387

(22) Filed: Aug. 27, 2007

(65) Prior Publication Data

US 2009/0059894 A1 Mar. 5, 2009

(51) Int. Cl.
| | |
|---|---|
| *H04W 4/00* | (2009.01) |
| *H04B 7/216* | (2006.01) |
| *H04L 12/66* | (2006.01) |
| *H04L 29/12* | (2006.01) |
| *H04L 12/54* | (2013.01) |
| *H04L 29/06* | (2006.01) |

(52) U.S. Cl.
CPC .......... *H04L 61/106* (2013.01); *H04L 12/5691* (2013.01); *H04L 29/12896* (2013.01); *H04L 61/605* (2013.01); *H04L 65/1016* (2013.01); *H04L 65/1069* (2013.01); *H04L 29/12066* (2013.01); *H04L 61/1511* (2013.01)

(58) Field of Classification Search
CPC ....... H04L 45/10; H04L 45/124; H04L 45/28; H04L 41/12; H04W 4/22; H04W 76/007
See application file for complete search history.

(56) References Cited

U.S. PATENT DOCUMENTS

| | | | |
|---|---|---|---|
| 6,426,955 B1 | 7/2002 | Gossett, Jr. et al. | |
| 6,697,333 B1 * | 2/2004 | Bawa et al. | 370/238 |
| 6,856,991 B1 | 2/2005 | Srivastava | |
| 6,914,886 B2 | 7/2005 | Peles et al. | |
| 7,047,315 B1 | 5/2006 | Srivastava | |
| 7,088,718 B1 | 8/2006 | Srivastava | |
| 7,145,898 B1 | 12/2006 | Elliott | |
| 7,180,864 B2 | 2/2007 | Basu et al. | |
| 7,180,912 B1 | 2/2007 | Samarasinghe | |
| 7,197,040 B2 | 3/2007 | Bressoud et al. | |
| 7,602,886 B1 * | 10/2009 | Beech et al. | 379/45 |
| 2003/0079027 A1 | 4/2003 | Slocombe et al. | |
| 2003/0117954 A1 | 6/2003 | De Neve et al. | |
| 2003/0182410 A1 | 9/2003 | Balan et al. | |
| 2003/0200307 A1 | 10/2003 | Raju et al. | |
| 2004/0146045 A1 | 7/2004 | Jimmei et al. | |
| 2004/0210670 A1 | 10/2004 | Anerousis et al. | |

(Continued)

OTHER PUBLICATIONS

Rosenberg, J., "Requirements for Management of Overload in the Session Initiation Protobol draft-ietf-sipping-overload-reqs-02", IETF draft recommendation, Oct. 2006, 21 pages. URL http://www.tools.ietf.org/html/draft-rosenberg-sipping-overload-reqs-02.

*Primary Examiner* — Melanie Jagannathan
(74) *Attorney, Agent, or Firm* — Hanley, Flight & Zimmerman, LLC

(57) ABSTRACT

Methods and apparatus to select a peered voice over Internet protocol (VoIP) border element are disclosed. An example method comprises receiving a session initiation protocol (SIP) message that includes an identifier representative of a location of a voice over Internet protocol (VoIP) access border element, querying a telephone number mapping (ENUM) database to identify two or more peered VoIP border elements, and selecting a one of the two or more peered VoIP border elements based on the identifier.

19 Claims, 6 Drawing Sheets

(56) References Cited

U.S. PATENT DOCUMENTS

| | | | |
|---|---|---|---|
| 2005/0010653 A1 | 1/2005 | McCanne | |
| 2005/0044141 A1 | 2/2005 | Hameleers et al. | |
| 2005/0058125 A1 | 3/2005 | Mutikainen et al. | |
| 2005/0083912 A1 | 4/2005 | Afshar et al. | |
| 2005/0149531 A1 | 7/2005 | Srivastava et al. | |
| 2006/0013147 A1 | 1/2006 | Terpstra et al. | |
| 2006/0056388 A1* | 3/2006 | Livingood | 370/352 |
| 2006/0064478 A1 | 3/2006 | Sirkin | |
| 2006/0112170 A1 | 5/2006 | Sirkin | |
| 2006/0130064 A1 | 6/2006 | Srivastava | |
| 2006/0146792 A1 | 7/2006 | Ramachandran et al. | |
| 2006/0159100 A1 | 7/2006 | Droms et al. | |
| 2006/0165064 A1 | 7/2006 | Brown et al. | |
| 2006/0209851 A1 | 9/2006 | Scudder et al. | |
| 2006/0233155 A1 | 10/2006 | Srivastava | |
| 2006/0233158 A1 | 10/2006 | Croak et al. | |
| 2006/0233159 A1 | 10/2006 | Croak et al. | |
| 2006/0291450 A1 | 12/2006 | Ramachandran et al. | |
| 2007/0019619 A1 | 1/2007 | Foster et al. | |
| 2007/0019623 A1 | 1/2007 | Alt et al. | |
| 2007/0019625 A1 | 1/2007 | Ramachandran et al. | |
| 2007/0036143 A1 | 2/2007 | Alt et al. | |
| 2007/0036151 A1 | 2/2007 | Baeder | |
| 2007/0047446 A1 | 3/2007 | Dalal et al. | |
| 2007/0058629 A1 | 3/2007 | Luft | |
| 2007/0061397 A1 | 3/2007 | Gregorat et al. | |
| 2007/0071221 A1 | 3/2007 | Allen et al. | |
| 2007/0073898 A1 | 3/2007 | Shen | |
| 2007/0086432 A1 | 4/2007 | Schneider et al. | |
| 2007/0086582 A1 | 4/2007 | Tai et al. | |
| 2007/0091878 A1 | 4/2007 | Croak et al. | |
| 2007/0149166 A1* | 6/2007 | Turcotte et al. | 455/404.1 |
| 2007/0191027 A1* | 8/2007 | McCormick et al. | 455/456.3 |

\* cited by examiner

US 9,124,603 B2

METHODS AND APPARATUS TO SELECT A PEERED VOICE OVER INTERNET PROTOCOL (VOIP) BORDER ELEMENT

FIELD OF THE DISCLOSURE

This disclosure relates generally to voice over Internet protocol (VoIP) networks and, more particularly, to methods and apparatus to select a peered VoIP border element.

BACKGROUND

Many voice over Internet Protocol (VoIP) service providers use peered border elements to allow a subscriber of a first VoIP service provider to initiate and/or establish a VoIP and/or Internet protocol (IP) Multimedia Subsystem (IMS) communication session with a subscriber of a second VoIP service provider. In general, peered border elements are responsible for processing, handling and/or routing signaling and/or media between two VoIP service provider networks. In many instances, two VoIP service providers will be peered via two or more pairs of border elements located at different geographic locations.

DETAILED DESCRIPTION

Methods and apparatus to select a peered voice over Internet protocol (VoIP) border element are disclosed. A disclosed example method includes receiving a session initiation protocol (SIP) message that includes an identifier representative of a location of a voice over Internet protocol (VoIP) access border element, querying a tElephone NUMber mapping (ENUM) database to identify two or more peered VoIP border elements, and selecting a one of the two or more peered VoIP border elements based on the identifier.

Another disclosed example method includes receiving a session initiation protocol (SIP) message at an access border element of a voice over Internet protocol (VoIP) network, modifying the SIP message at the access border element to include a field representative of a location of the access border element, and sending the modified SIP message to a call session control function (CSCF) server.

A disclosed example policy server includes an interface to receive an identifier representative of a location of an access border element of voice over Internet protocol (VoIP) network, an inter-region mapping database to store a plurality of distances between a respective plurality of pairs of access border locations and peered border elements of the VoIP network, and a peer selector to query the inter-region mapping database based on the identifier to select a preferred peered border element for the access border element.

A disclosed example access border element for a voice over Internet protocol (VoIP) network includes a first interface to receive a session initiation protocol (SIP) message from a VoIP device, a location reference inserter to modify the SIP message to include a field representative of a location of the access border element, and a second interface to send the modified SIP message to a call session control function server (CSCF) server.

In the interest of brevity and clarity, throughout the following disclosure references will be made to the example Internet protocol (IP) Multimedia subsystem (IMS) based voice over IP (VoIP) network 110 of FIG. 1. Moreover, the following disclosure will be made using session initiation protocol (SIP) messages and/or SIP-based message exchanges. However, it should be understood that the methods and apparatus described herein to select a peered border element are applicable to other IMS and/or VoIP communication systems and/or networks (e.g., networks based on soft switches), VoIP devices, IMS devices, feature servers, tElephone NUMber mapping (ENUM) servers, border elements, access networks, IP networks, IMS networks and/or IMS communication systems, and/or other types of protocols, messages, and/or message exchanges.

Figure 1:
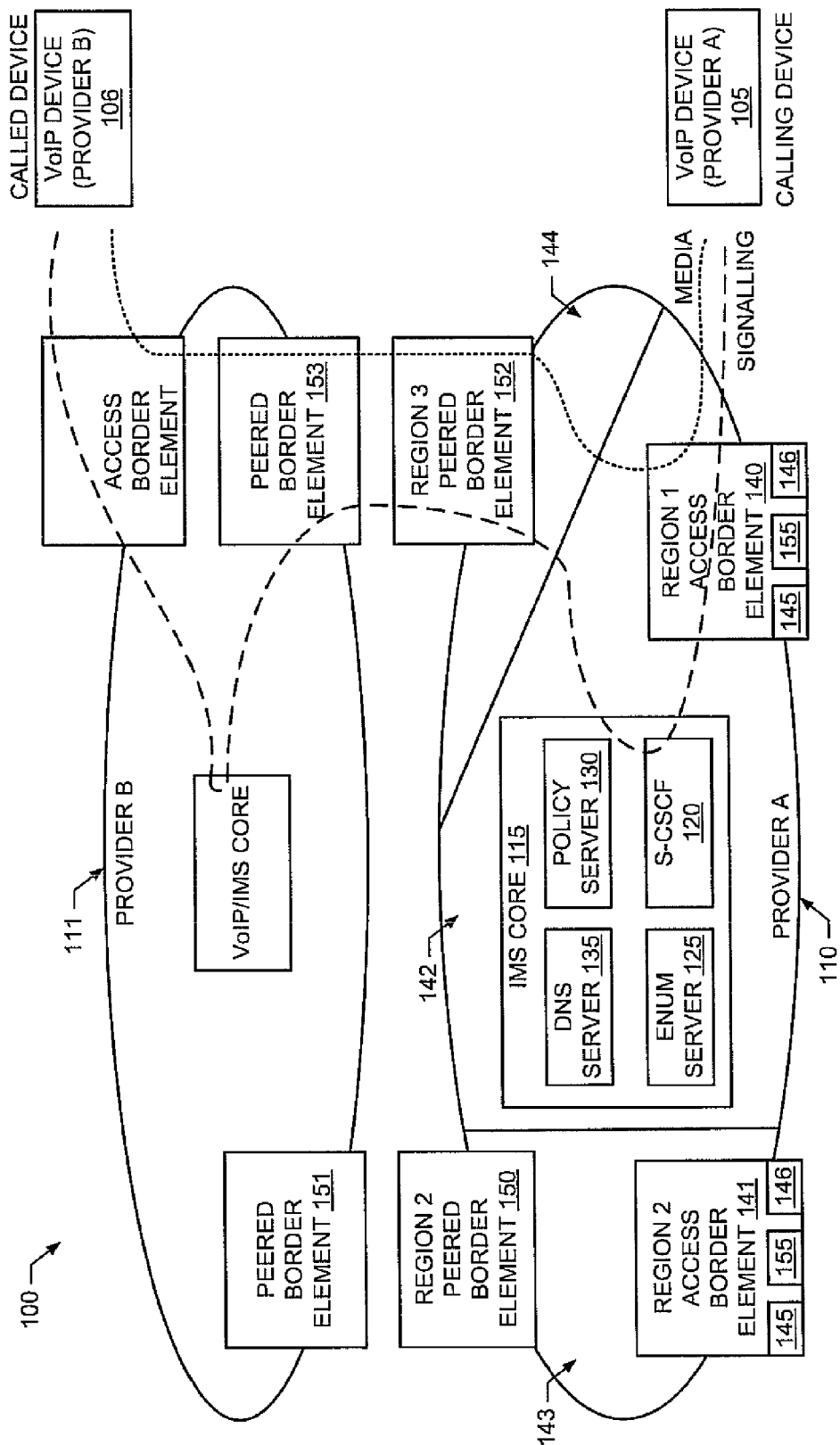
FIG. 1 is a schematic illustration of an example communication systems constructed in accordance with the teachings of the disclosure.

FIG. 1 is a schematic illustration of an example communication system 100 including any number and/or type(s) of VoIP user devices, two of which are designated at reference numerals 105 and 106. Example VoIP user devices 105 and 106 include, but are not limited to, IMS (e.g., VoIP) phones, VoIP residential gateways, VoIP enabled personal computers (PC), VoIP endpoints, wireless VoIP devices (e.g., a wireless-fidelity (WiFi) Internet protocol (IP) phone), VoIP adapters (e.g., an analog telephone adapter (ATA)), VoIP enabled personal digital assistants (PDA), and/or VoIP kiosks. The example VoIP devices 105 and 106 of FIG. 1 may be implemented and/or be found at any number and/or type(s) of locations. Further, the VoIP devices 105 and 106 may be fixed location devices, substantially fixed location devices and/or mobile devices. Moreover, the VoIP devices 105 and 106 may have equipment communicatively and/or electrically coupled to them. For example, a VoIP ATA may be coupled to a telephone, and/or a VoIP residential gateway may be coupled to a PC and/or set-top box. Further still, the VoIP devices 105 and 106 may be associated with the same and/or different service providers. For example as shown in FIG. 1, the VoIP device 105 is associated with a first service provider 110, and the VoIP device 106 is associated with a second service provider 111.

To provide communication services to a first set of subscribers (e.g., associated with a first service provider), the example communication system 100 of FIG. 1 includes an IMS network 110 made available by the provider A. Likewise, to provide communication services to a second set of subscribers (e.g., associated with a second service provider), the example communication system 100 of FIG. 1 includes any type of IMS and/or VoIP network 111 made available by the provider B. In some instances, the example network 111 implements the methods and/or apparatus to select a peered border element described below in connection with the IMS network 110. In general, the example IMS network 110 of FIG. 1 provides and/or enables IMS communication services (e.g., telephone services, Internet services, data services, messaging services, instant messaging services, electronic mail (email) services, chat services, video services, audio services, gaming services, voicemail, facsimile services, etc.) to the example VoIP device 105, and/or to VoIP devices of other service providers (e.g., the example VoIP device 106).

To implement the communication services, the example IMS network 110 of FIG. 1 includes an IMS core 115. In the illustrated example IMS network 110 of FIG. 1, each VoIP device (e.g., the example VoIP device 105) that is registered to the example IMS network 110 is associated with and/or assigned to a serving call session control function (S-CSCF) server (one of which is designated in FIG. 1 with reference numeral 120). The example S-CSCF server 120 of FIG. 1 is responsible for handling incoming and/or outgoing IMS (e.g., VoIP) communication sessions (e.g., telephone calls, and/or data and/or video sessions) associated with its registered VoIP devices (e.g., the VoIP device 105).

While one S-CSCF server 120 is illustrated in FIG. 1, the IMS core 115 and/or, more generally, the example IMS network 110 may include any number and/or type(s) of S-CSCF servers, and each such S-CSCF server may support any number and/or type(s) of VoIP devices. The example S-CSCF server 120 of FIG. 1 performs session control, maintains session states and/or enables communications with call feature servers (not shown) for its associated and/or registered VoIP devices. For instance, when the VoIP device 105 initiates, for example, an outgoing telephone call to the example VoIP device 106, a communication session initiation message (e.g., a SIP INVITE message) sent by the VoIP device 105 is routed by the IMS network 110 to the S-CSCF server 120 associated with the VoIP device 105.

To locate and/or identify the VoIP device and/or VoIP endpoint (e.g., the example VoIP device 106) associated with a called party (e.g., a called telephone number), the example IMS core 115 of FIG. 1 includes any number of ENUM servers, one of which is designated in FIG. 1 with reference numeral 125. Based upon an ENUM query request message received from a S-CSCF server (e.g., the example S-CSCF server 120), the example ENUM server 125 of FIG. 1 performs a lookup of an ENUM database (not shown) that stores associations of called party identifiers (e.g., E.164 telephone numbers) to one or more uniform resource identifiers (URIs) (e.g., a SIP URI, an HTTP URI, etc. corresponding to peered border elements and/or called devices). However, an ENUM database may store any number and/or type(s) of associations between any number and/or type(s) of identifiers. The example ENUM server 125 determines whether a called party (e.g., the VoIP device 106) is associated with another service provider (e.g., the service provider 111). When the called party is associated with another service provider, the example ENUM server 125 returns a SIP URI for each of one or more peered border elements (e.g., the example peered border elements 150, 152 described below) by which the requested communication session may be initiated to the called party. When the called party is not associated with another service provider, the ENUM server 125 returns a URI associated with the called device.

To select which of two or more peered border elements to use for a particular communication session, the example IMS core 115 of FIG. 1 includes a policy server 130. Based on a location of an access border element (e.g., an identifier for a particular geographic region) via which a communication session initiation message was received by the IMS network 110 (e.g., the example access border elements 140, 141 described below), and based on the peered border element SIP URIs returned by the example ENUM server 125, the example policy server 130 of FIG. 1 selects a preferred peered border element. The example policy server 130 selects the peered border element that is a) capable of routing the communication session initiation message to the other service provider and b) closest to the access border element by which the communication session initiation message was received by the IMS network 110. However, additional and/or alternative criteria may be used to select a peered border element such as, for example, latency and/or number of hops. An example manner of implementing the example policy server 130 of FIG. 1 is described below in connection with FIG. 4. An identifier representative of the peered border element selected by the policy server 130 (e.g, a SIP URI associated with the selected peered border element) is returned to and/or used by the S-CSCF server 120 to initiate the communication session to the called party.

To resolve a URI to an IP address, the example IMS core 115 of FIG. 1 includes any type of DNS server 135. For a particular URI (SIP, HTTP and/or otherwise) and using any applicable method(s), logic and/or algorithm(s), the example DNS server 135 performs a DNS lookup to obtain an IP address assigned to and/or associated with the URI.

To provide entry and/or exits points to the example IMS network 110, the example IMS network 110 of FIG. 1 includes any number of access border elements, two of which are designated at reference numerals 140 and 141. The example access border elements 140 and 141 of FIG. 1 implement boundary points between a) one or more private networks used to implement the example IMS network 110, and b) one or more public networks (e.g., the Internet), one or more private networks (e.g., home and/or corporate local area networks) and/or one or more access networks by which the example VoIP device 105 may be communicatively coupled to one or both of the example border elements 140 and 141. Each of the example access border elements 140, 141 includes a first interface 145 to one or more private networks used to implement the example IMS network 110, and a second interface 146 to one or more public networks (e.g., the Internet), one or more private networks (e.g., home and/or corporate local area networks) and/or one or more access networks by which the example VoIP device 105 may be communicatively coupled to the access border element 140, 141. The example first interfaces 145 and the example second interfaces 146 of FIG. 1 operate in accordance with any of the Institute of Electrical and Electronics Engineers (IEEE) 802.3x (a.k.a. Ethernet) family of standards. In some instances, the example access border elements 140 and 141 may implement and/or carry out call admission control, denial of service control, SIP header manipulation and/or media anchoring. In the example IMS network 110, the access border elements 140 and 141 are located to provide geographically separate entry and/or exit points for the IMS network 110. For example, the access border element 140 is an access point for a first geographic region 142, while the access border element 141 is an access point for a second geographic region 143.

The example service provider networks 110 and 111 of FIG. 1 are communicatively coupled via any number of pairs of peered border elements. A first pair of peered border elements is designated in FIG. 1 with reference numerals 150 and 151, and a second pair of peered border elements is designated with reference numerals 152 and 153. Peered border elements 150-153 are corresponding border elements of two different service provider networks (e.g., the example networks 110 and 111) that are implemented by the service providers to facilitate communication sessions between subscribers of the two service providers. Peered border elements 150-153 implement, for example, handshaking, media translation(s) and/or protocol message modification(s) to facilitate communications across the two service provider networks.

Typically, the pairs of peered border elements 150, 151 and 152, 153 are located so as to provide communicatively coupling between the service provider networks 110 and 111 at geographically separated locations. For example, the peered border element 150 is located in the same geographic region 143 as the access border element 141, while the peered border element 152 is located in a third geographic region 144 of the IMS network 110. The locations at which peered border elements 150, 152 are located may differ depending on with which service provider(s) the IMS network 110 has a peering relation. In some examples, the peered border elements 150-153 are located at IP peering locations to facilitate deterministic IP quality-of-service. However, not all IP peering locations need support VoIP peering. As shown in FIG. 1, not all geographic regions of the IMS network 110 need include a peered border element 150, 152 and/or an access border element 140, 141. For example, not every region containing an access border element 140, 141 needs to contain a peered border element 150, 152. Likewise, not every region containing a peered border element 150, 151 needs to contain an access border element 140, 142. In general, a platform, computer and/or workstation used to implement an access border element 140, 141 may be configured to, additionally or alternatively, implement a peered border element 150-153.

When a communication session is initiated from a device of the service provider network 110 (e.g., from the VoIP device 105) to a device of another service provider network 111 (e.g., the VoIP device 106), the service provider network 110 must choose a peered border element 150, 152 through which to route the requested communication session. To facilitate selection of a peered border element 150, 152, the example access border elements 140 and 141 of FIG. 1 each include a location reference inserter 155. When an access border element 140, 141 receives a communication session initiation request message (e.g., the example SIP INVITE message 205 of FIG. 2), the example location reference inserter 155 of FIG. 1 modifies the request message (e.g., by inserting an additional header, field and/or identifier into the SIP INVITE message) to specify the geographic location of the access border element 140, 141. Each of the example location reference inserters 155 is provisioned with the geographic location information for the access border element 140, 141 that implements the location reference inserter 155. The example access border element 140, 141 sends the modified SIP INVITE message 210 to the S-CSCF 120 associated with the calling VoIP device 105. An example data structure that may be used to implement a SIP INVITE message 210 that contains location information for an access border element 140, 141 is described below in connection with FIG. 3.

Figure 2:
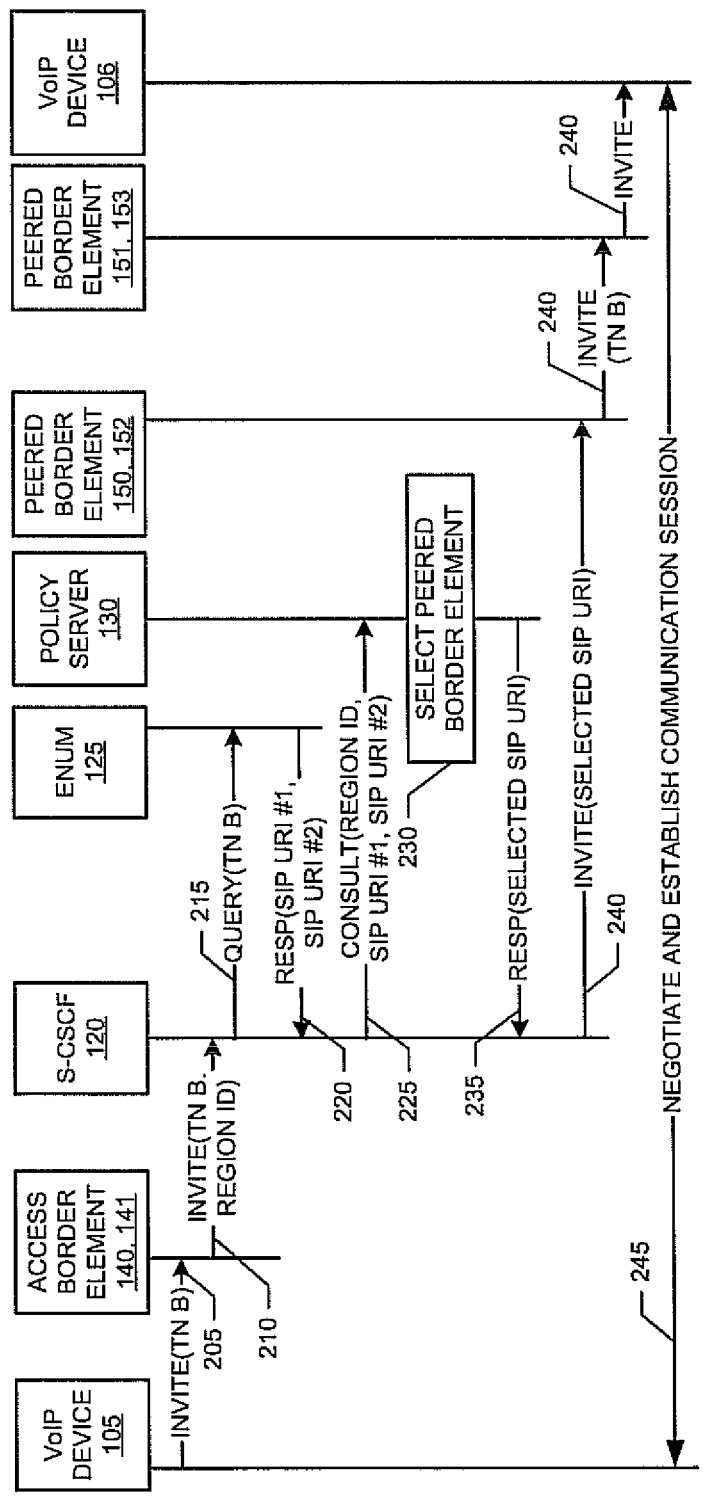
FIG. 2 illustrates example protocol message exchanges and flowcharts representative of machine accessible instructions that may be executed by, for example, a processor to implement any or all of the example access border elements, the example serving call session control function (S-CSCF) servers, the example policy servers and/or, more generally, the example Internet protocol (IP) Multimedia Subsystem (IMS) network described herein.

As shown in FIG. 2, when the example S-CSCF SERVER 120 receives the modified communication session initiation request message 210, the S-CSCF SERVER 120 performs an ENUM query 215 via the ENUM server 125. The ENUM server 125 responds 220 with one or more URIs (e.g., a first URI for the peered border element 150, and a second URI for the peered border element 152). When the ENUM server 125 returns URIs for two or more peered border elements, the S-CSCF SERVER 120 provides the geographic location information for the access border element 140, 141 and the URIs returned by the ENUM server 120 to the policy server 130 (as signified at line 225 in FIG. 2). The example policy server 130 selects a peered border element 150, 152 to be used (block 230), and returns 235 the URI for the selected peered border element 150, 152. The S-CSCF server 120 then performs a DNS lookup based on the returned URI (not shown) and uses the obtained IP address to initiate the requested communication session via a request message 240. If the ENUM server 125 returned a URI for a single peered border element and/or for a called device, the S-CSCF server 120 may perform the DNS lookup and/or initiate the communication session without consulting the policy server 130.

The peered border element 150, 152 sends the SIP INVITE message 240 to its peer 151, 153 in the other network. The other network routes the SIP INVITE message 240 to the called VoIP device 106. Using applicable past, present and/or future negotiation and/or communication establishment methods 245, the VoIP device 105 and the VoIP device 106 establish the requested communication session.

While an example IMS network 110 has been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example S-CSCF server 120, the example ENUM server 125, the example policy server 130, the example DNS server 135, the example access border elements 140, 141, the example interfaces 145, 146, the example peered border elements 150, 152, the example location reference inserters 155 illustrated in FIG. 1 are logical entities. They may, therefore, be implemented separately and/or in any combination using, for example, machine accessible instructions executed by one or more computing devices and/or computing platforms (e.g., the example processing platform 900 of FIG. 9). Further, the example IMS core 115, the example S-CSCF server 120, the example ENUM server 125, the example policy server 130, the example DNS server 135, the example access border elements 140, 141, the example interfaces 145, 146, the example peered border elements 150, 152, the example location reference inserters 155 and/or, more generally, the example IMS network 110 may be implemented by hardware, software, firmware and/or any combination of hardware, software and/or firmware. Further still, the example IMS network 110 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors. For example, the IMS core 115 may include one or more of a proxy CSCF server, an interrogating CSCF server, a feature server, an application server, a home subscriber server (HSS), a media gateway, a breakout gateway control function (BGCF) sever, a media gateway control function (MGCF) server, a softswitch, an IP router, an IP switch, etc.

Figure 3:
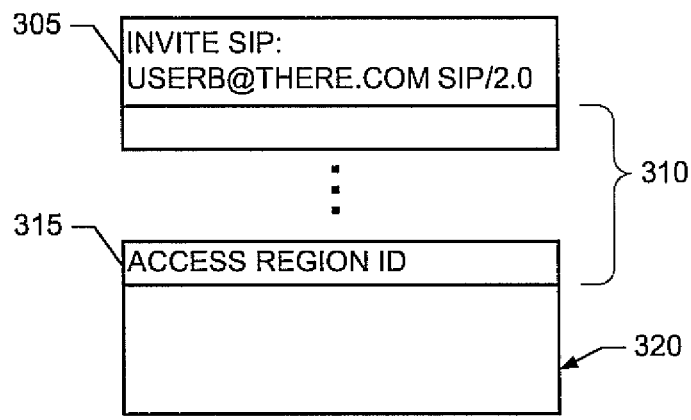
FIG. 3 illustrates an example data structure that may be used to implement a session initiation protocol (SIP) protocol message.

FIG. 3 illustrates an example data structure that may be used to implement a SIP message, such as a SIP communication session request message (e.g., a SIP INVITE message). To identify the SIP message, the example data structure of FIG. 3 includes a name field 305. The example name field 305 of FIG. 3 includes an alphanumeric string that identifies the SIP message and identifies a destination for the example message. The example SIP message illustrated in FIG. 3 is a SIP INVITE message and, thus, the example name field 305 contains a string that includes "INVITE". Such a SIP message may be sent to, for example, initiate a communication session to a called device. In the illustrated example, the SIP message is addressed to userb@there.com. Persons of ordinary skill in the art will readily recognize that the name field 305 could be used to identify any type of SIP message to any applicable destination(s).

To provide additional values and/or parameters, the example data structure of FIG. 3 includes one or more header fields 310. Example header fields 310 include, but are not limited to, a from field, a caller identification field, a command sequence number field, and/or an access border element location header 315. The number of header fields 310, in some examples, depends upon the type of SIP message and/or the protocol(s) implemented by either endpoint. The example access border element location header 315 of FIG. 3 contains a value and/or alphanumeric string that represents the geographic location of the access border element sending the example SIP message to a S-CSCF server. To convey and/or carry any number and/or type(s) of additional data and/or information, the example data structure of FIG. 3 includes a payload 320.

When an access border element (e.g., any of the example access border elements 140, 141 of FIG. 1) receives a SIP INVITE message from a VoIP device (e.g., the example VoIP device 105), the access border element (e.g., a location reference inserter 155) modifies the received SIP INVITE message to include the example adds the access border element location header 315. The access border element then sends the example modified SIP INVITE message to the S-CSCF server (e.g., the example S-CSCF server 120) associated with the VoIP device. The example access border element location field header 315 of FIG. 3 is a private header for internal use within the example IMS network 110 of FIG. 1 and may, in some instances, cause compatibility issues with other service providers 111. Thus, before the example SIP message of FIG. 3 is transmitted outside of the IMS network 110, the access border element location field header 315 is removed by, for example, the S-CSCF server before the S-CSCF servers sends and/or forwards the example SIP message to, for example, a peered border element (e.g., any of the example peered border elements 150, 152).

While an example data structure is illustrated in FIG. 3, the example data structure may be implemented using any number and/or type(s) of other and/or additional fields and/or data. Further, the fields and/or data illustrated in FIG. 3 may be combined, divided, re-arranged, eliminated and/or implemented in any way. Moreover, the example data structure may include fields and/or data in addition to, or instead of, those illustrated in FIG. 3, and/or may include more than one of any or all of the illustrated fields and/or data.

Figure 4:
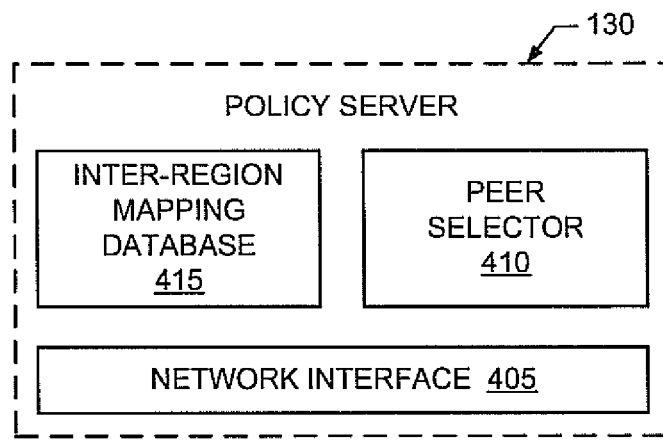
FIG. 4 illustrates an example manner of implementing the example policy server of FIG. 1.

FIG. 4 illustrates an example manner of implementing the example policy server 130 of FIG. 1. To communicate with other devices an IMS core (e.g., with the example S-CSCF server 120), the example policy server 130 of FIG. 4 includes any type of network interface 405. The example interface 405 of FIG. 4 operates in accordance with any of the IEEE 802.3x (a.k.a. Ethernet) family of standards.

To select a peered border element to use for a called device (e.g., the example VoIP device 106 of FIG. 1) associated with another service provider (e.g., the provider 111), the example policy server 130 of FIG. 4 includes a peer selector 410. Based on a location of an access border element (e.g., an identifier for a particular geographic region) via which a communication session initiation message was received by an IMS network (e.g., the example border element 140), and based on URIs associated with two or more possible peered border elements via which a communication session may be established to a called party of another service provider, the example peer selector 410 of FIG. 4 selects a preferred peered border element. The example peer selector 410 selects the peered border element (e.g., peered border element 150, 152) that is a) capable of routing the communication session initiation message to the other service provider and b) closest to the access border element 140, 141 by which the communication session initiation message was received by the IMS network 110. However, additional and/or alternative criteria may be used to select a peered border element such as, for example, latency and/or number of hops.

To store information representative of routing metrics (e.g., geographic distances) between access border elements and peered border elements, the example policy server 130 of FIG. 4 includes a inter-region mapping database 415. For each possible and/or allowable access border element—peered border element pair, the example inter-region mapping database 415 contains a value representative of a routing metric (e.g., representative of the geographic distance between the access border element and the peered border element). The example peer selector 410 of FIG. 4 queries the example inter-region mapping database 415 to determine the routing metrics (e.g., geographic distances) between the access border element via which a communication session initiation message was received and each of the possible peered border elements via which the communication session may be initiated. An example data structure that may be used to implement the example inter-region mapping database 415 of FIG. 4 is described below in connection with FIG. 5.

While an example manner of implementing the example policy server 130 of FIG. 1 has been illustrated in FIG. 4, one or more of the interfaces, data structures, elements, processes and/or devices illustrated in FIG. 4 may be combined, divided, re-arranged, omitted, eliminated and/or implemented in any other way. Further, the example network interface 405, the example peer selector 410, the example inter-region mapping database 415 and/or, more generally, the example policy server 130 of FIG. 4 may be implemented by hardware, software, firmware and/or any combination of hardware, software and/or firmware. Further still, a border element may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
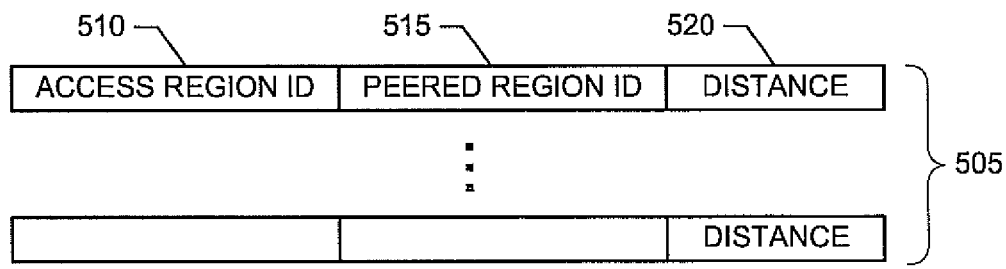
FIG. 5 illustrates an example data structure that may be used to implement the example inter-region mapping database of FIG. 4.

FIG. 5 illustrates an example data structure that may be used to implement the example inter-region mapping database 415 of FIG. 4. The example data structure of FIG. 5 includes a plurality of entries 505 for respective ones of a plurality of pairs of access border elements and peered border elements. To identify a geographic location of an access border element, each of the example entries 505 of FIG. 5 includes an access region identifier field 510. The example access region identifier field 510 of FIG. 5 contains a value and/or alphanumeric string that identifies a particular region of an IMS network in which an access border element may be located.

To identify a geographic location of a peered border element, each of the example entries 505 of FIG. 5 includes a peered region identifier field 515. The example peered region identifier field 515 of FIG. 5 includes a value and/or alphanumeric string that identifies a particular region of an IMS network in which a peered border element may be located.

To specify a routing metric associated with the access border element region specified by the field 510 and the peered border element region specified by the field 515, each of the example entries 505 of FIG. 5 includes a distance field 520. The example distance field 520 of FIG. 5 contains a value representative of a geographic distance.

While an example data structure that may be used to implement the example inter-region mapping database 415 of FIG. 4 is illustrated in FIG. 5, the example data structure of FIG. 5 may be implemented using any number and/or type(s) of other and/or additional fields and/or data. Further, the fields and/or data illustrated in FIG. 5 may be combined, divided, re-arranged, eliminated and/or implemented in any way. Moreover, the example data structure may include fields and/or data in addition to, or instead of, those illustrated in FIG. 5, and/or may include more than one of any or all of the illustrated fields and/or data.

Figure 6:
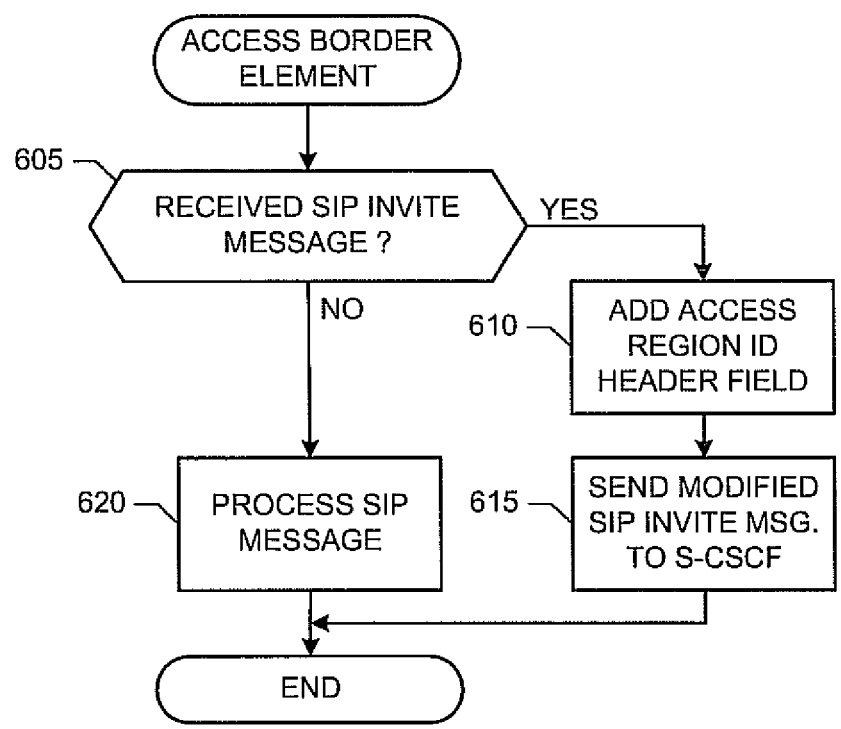
FIG. 6 is a flowchart representative of example machine accessible instructions that may be executed by, for example, a processor to implement any or all of the example access border elements of FIGS. 1 and/or 2.
Figure 7:
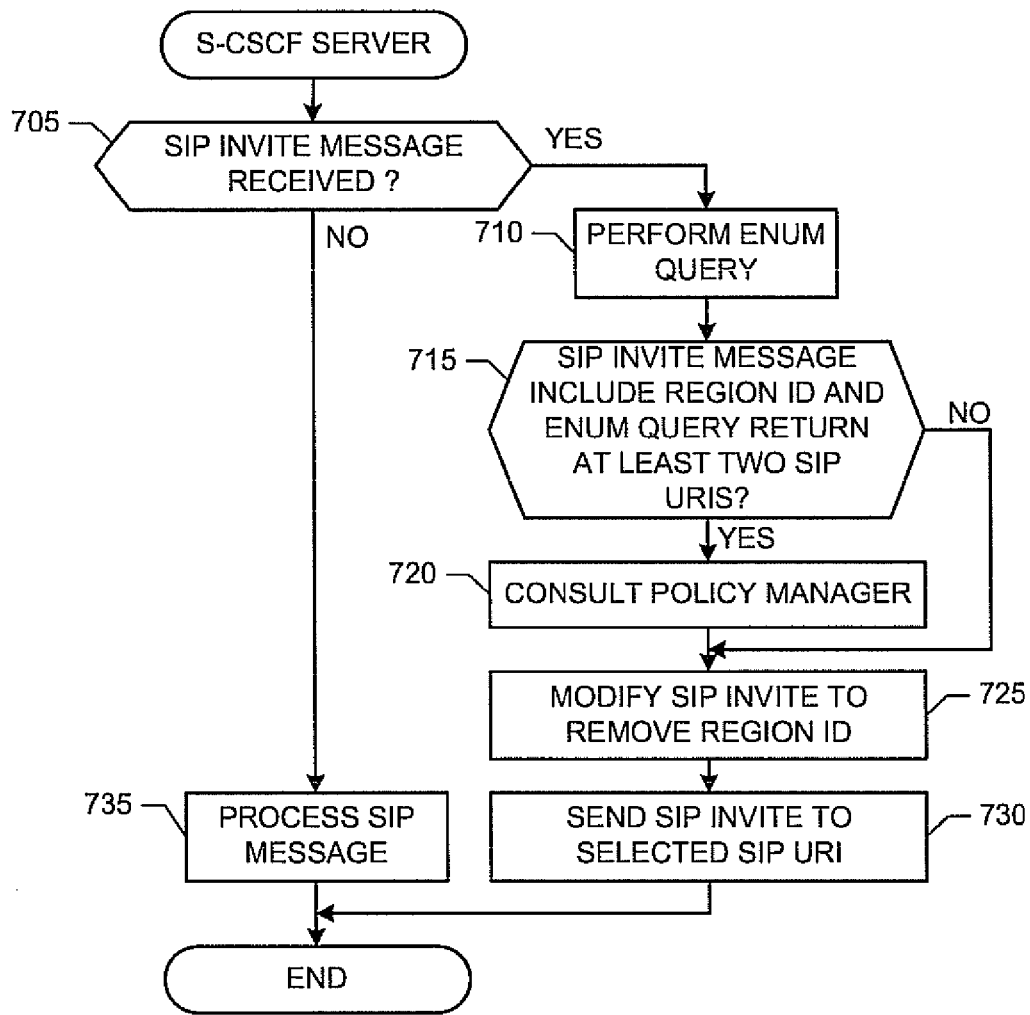
FIG. 7 is a flowchart representative of example machine accessible instructions that may be executed by, for example, a processor to implement any or all of the example S-CSCF servers of FIGS. 1 and/or 2.
Figure 8:
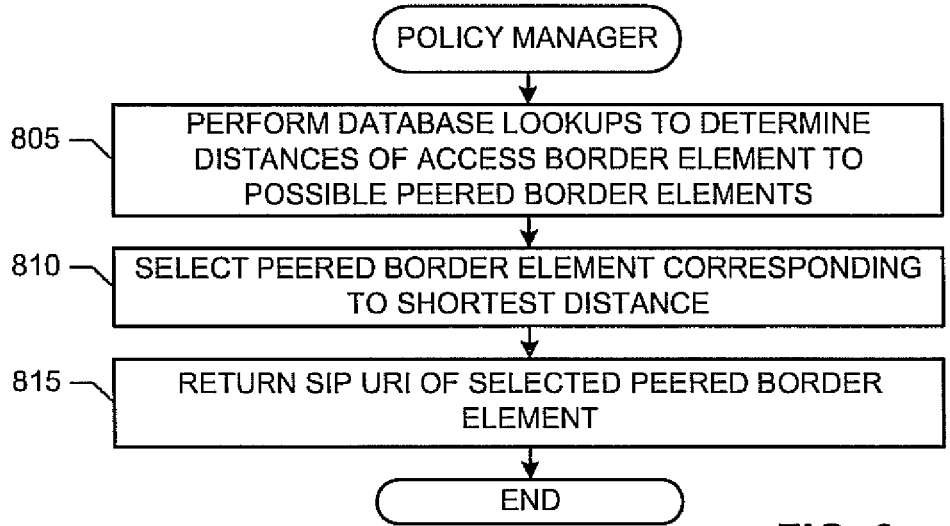
FIG. 8 is a flowchart representative of example machine accessible instructions that may be executed by, for example, a processor to implement any or all of the example policy servers of FIGS. 1, 2 and/or 4.

FIG. 6 illustrates example machine accessible instructions that may be executed to implement any or all of the example access border elements 140, 141 of FIG. 1. FIG. 7 illustrates example machine accessible instructions that may be executed to implement the example S-CSCF server 120 of FIG. 1. FIG. 8 illustrates example machine accessible instructions that may be executed to implement any or all of the example policy servers 130 of FIGS. 1 and/or 4.

The example protocol exchanges and/or the example machine accessible instructions of FIGS. 2, 6, 7 and/or 8 may be carried out by a processor, a controller and/or any other suitable processing device. For example, the example protocol exchanges and/or the machine accessible instructions of FIGS. 2, 6, 7 and/or 8 may be embodied in coded instructions stored on a tangible medium such as a flash memory, a ROM and/or RAM associated with a processor (e.g., the example processor 905 discussed below in connection with FIG. 9). Alternatively, some or all of the example protocol exchanges and/or the machine accessible instructions of FIGS. 2, 6, 7 and/or 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example protocol exchanges and/or the machine accessible instructions of FIGS. 2, 6, 7 and/or 8 may be implemented manually or as any combination of any of the foregoing techniques, for example, any combination of firmware, software, discrete logic and/or hardware. Further, persons of ordinary skill in the art will readily appreciate that many other methods of implementing the example operations of FIGS. 2, 6, 7 and/or 8 may be employed. For example, the order of execution of the blocks may be changed, and/or one or more of the blocks described may be changed, eliminated, sub-divided, or combined. Additionally, persons of ordinary skill in the art will appreciate that any or all of the example protocol exchanges and/or the machine accessible instructions of FIGS. 2, 6, 7 and/or 8 may be carried out sequentially and/or carried out in parallel by, for example, separate processing threads, processors, devices, discrete logic, circuits, etc.

The example machine accessible instructions of FIG. 6 begin when an access border element (e.g., any of the example access border elements 140, 141 of FIG. 1) receives a SIP message from a VoIP device (e.g., the example VoIP device 105) via an interface (e.g., the example interface 146). If the received SIP message is a SIP INVITE message (block 605), the access border element (e.g., the example location reference inserter 155) modifies the received SIP INVITE message by adding a header (e.g., the example access border element location header 315 of FIG. 3) that represents the location of the access border element (block 610). The access border element sends the modified SIP INVITE message to the S-CSCF server (e.g., the example S-CSCF server 120) associated with the VoIP device via a second interface (e.g., the example interface 145) (block 615). Control then exits from the example machine accessible instructions of FIG. 6.

Returning to block 605, if the received SIP message is not a SIP INVITE message (block 605), the access border element performs normal processing of the received SIP message (block 620). Control then exits from the example machine accessible instructions of FIG. 6.

The example machine accessible instructions of FIG. 7 begin when a S-CSCF server (e.g., the example S-CSCF server 120 of FIG. 1) receives a SIP message from an access border element (e.g., any of the example access border elements 140, 142). The SIP message may have been modified to include an access region ID header field, as describe above in connection with FIG. 3. If the received SIP message is a SIP INVITE message (block 705), the S-CSCF server performs an ENUM query (block 710). If the received SIP INVITE message included access border element location information (e.g., the example access border element location header 315 of FIG. 3) and the ENUM query response includes URIs for two or more peered border elements (block 715), the S-CSCF server consults with a policy server (e.g., any of the example policy servers 130 of FIGS. 1 and/or 4) to select a peered border element (block 720). The S-CSCF server modifies the SIP INVITE message to remove the access border location information from the SIP INVITE message (block 725), and sends the modified SIP INVITE message to the peered border element selected by the policy server (block 730). Control then exits from the example machine accessible instructions of FIG. 7.

Returning to block 715, if the received SIP INVITE message did not include access border element location information (e.g., the example access border element location header 315 of FIG. 3) and/or the ENUM query response did not include URIs for two or more peered border elements (block 715), the S-CSCF server modifies the SIP INVITE message to remove the access border location information (if any) from the SIP INVITE message (block 725), and sends the, possibly modified, SIP INVITE message to the URI obtained via the ENUM query (block 730). Control then exits from the example machine accessible instructions of FIG. 7.

Returning to block 705, if the received SIP message is not a SIP INVITE message (block 705), the S-CSCF server performs normal processing of the received SIP message (block 735). Control then exits from the example machine accessible instructions of FIG. 7.

The example machine accessible instructions of FIG. 8 begin when a policy server (e.g., any of the example policy servers 130 of FIGS. 1 and/or 4) is consulted by a S-CSCF server (e.g., the example S-CSCF server 120) via an interface (e.g., the example interface 405 of FIG. 4). Based on the access border location information and URIs for two or more peered border elements, the policy server (e.g., the example peer selector 410) performs database queries (e.g., of the example inter-region mapping database 415) to determine the geographic distance between the access border element and each of the possible peered border elements (block 805). The peer selector selects the peered border element associated with the shortest distance to the access border element (block 810). The policy server returns an identifier of the selected peered border element to the S-CSCF server via the interface (block 815). Control then exits from the example machine accessible instructions of FIG. 8.

Figure 9:
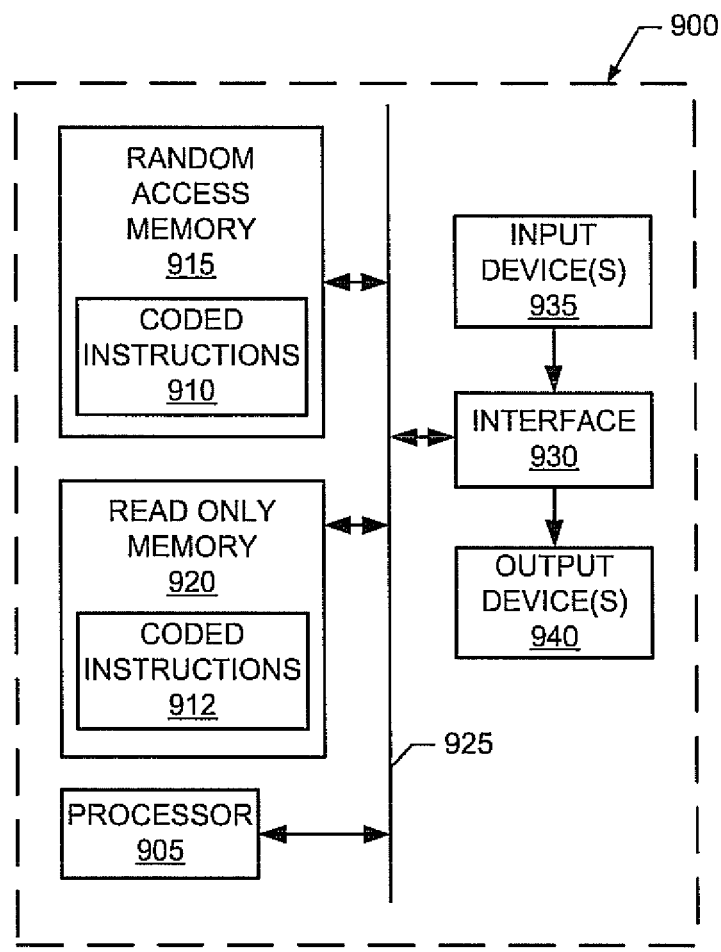
FIG. 9 is a schematic illustration of an example processor platform that may be used and/or programmed to carry out the protocol message exchanges and/or the example machine accessible instructions of FIGS. 2, 6, 7 and/or 8 to implement any of all of the example methods and apparatus described herein.

FIG. 9 is a schematic diagram of an example processor platform 900 that may be used and/or programmed to implement all or a portion of any or all of the example VoIP devices 105 and/or 106, the example S-CSCF server 120, the example policy server 130, the example access border elements 140, 141, the example location reference inserters 155, and/or the example border elements 150-153 of FIGS. 1 and/or 4. For example, the processor platform 900 can be implemented by one or more general purpose processors, processor cores, microcontrollers, etc.

The processor platform 900 of the example of FIG. 9 includes at least one general purpose programmable processor 905. The processor 905 executes coded instructions 910 and/or 912 present in main memory of the processor 905 (e.g., within a random-access memory (RAM) 915 and/or a read-only memory (ROM) 920). The processor 905 may be any type of processing unit, such as a processor core, a processor and/or a microcontroller. The processor 905 may execute, among other things, the example protocol message exchanges and/or the example protocol exchanges and/or the example machine accessible instructions of FIGS. 2, 6, 7 and/or 8 to implement the example methods and apparatus described herein.

The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memory 915 and the memory 920 may be controlled by a memory controller (not shown). One or both of the example memories 915 and 920 may be used to implement the example inter-region mapping database 415 of FIG. 4.

The processor platform 900 also includes an interface circuit 930. The interface circuit 930 may be implemented by any type of interface standard, such as an external memory interface, serial port, general purpose input/output, etc. One or more input devices 935 and one or more output devices 940 are connected to the interface circuit 930. The input devices 935 and/or output devices 940 may be used to, for example, implement the example interfaces 145, 146 and 405 of FIGS. 1 and 4.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   inserting an additional header field into a session initiation protocol message received from a calling device;
   populating the additional header field with data indicative of a location of a first access border element;
   querying a telephone number mapping database to identify second and third peered border elements associated with the first access border element; and
   selecting one of the second and third peered border elements based on (a) the data of the additional header field, (b) a quantity of hops between the first access border element and one of the second or third peered border elements, and (c) a latency criterion associated with at least one of the second and third peered border elements.

2. A method as defined in claim 1, further comprising sending the session initiation protocol message to the selected one of the second and third peered border elements.

3. A method as defined in claim 1, wherein the session initiation protocol message comprises a session initiation protocol INVITE message.

4. A method as defined in claim 1, wherein the session initiation protocol message includes an identifier that identifies a called party, and the telephone number mapping query is performed based on the identifier.

5. A method as defined in claim 1, wherein the telephone number mapping query returns two or more session initiation protocol uniform resource identifiers for respective ones of the second and third peered border elements.

6. A method as defined in claim 1, further comprising selecting the one of the second and third peered border element that is closest to the first access border element.

7. A method as defined in claim 1, further comprising querying a database to select the one of the second and third peered border elements.

8. A method as defined in claim 1, further comprising consulting a policy manager to select the one of the second and third peered border elements.

9. A method as defined in claim 1, wherein the second and third peered border elements are voice over Internet protocol border elements.

10. A method as defined in claim 1, wherein the first access border element is a voice over Internet protocol access border element.

11. A policy server comprising:
- an interface to insert an additional header field in a session initiation protocol message received from a calling device and to modify data in the additional header field to represent a location of an access border element of a voice over Internet protocol network; and
- a peer selector to query an inter-region mapping database based on the data in the additional header field and to select a preferred peered border element for the access border element based on (a) the data in the additional header field, (b) a quantity of hops between the access border element and the preferred peered border element, and (c) a latency criterion between the preferred peered border element and the access border element.

12. A policy server as defined in claim 11, wherein the interface comprises a serving call session control function service interface.

13. A policy server as defined in claim 11, wherein the interface is to receive two or more peered border element identifiers representative of two or more respective peered border elements that may be used for a requested communication session, and wherein the peer selector is to select the preferred peered border element from the two or more peered border element identifiers.

14. A policy server as defined in claim 11, wherein the peer selector is to:
- perform a first query to obtain a first distance between the access border element and a first one of a plurality of peered border element identifiers;
- perform a second query to obtain a second distance between the access border element and a second one of a plurality of peered border element identifiers; and
- select the first one of the plurality of peered border element identifiers as the preferred peered border element when the first distance is less than the second distance.

15. A policy server as defined in claim 11, wherein the inter-region mapping database comprises a plurality of records, a first of the plurality of records comprises a first identifier representative of the access border element, a second identifier representative of the preferred peered border element, and a distance between the access border element and the preferred peered border element.

16. A method comprising:
- inserting an additional header field in a session initiation protocol message received at an access border element of a voice over Internet protocol network, and adding data representative of a location of the access border element to the additional header field, the session initiation protocol message sourced from a calling device; and
- sending the modified session initiation protocol message to a call session control function server after selecting one of a second and third peered voice over Internet protocol border element based on (a) the data of the modified header field, (b) a quantity of hops between the access border element and one of the second or third peered voice over Internet protocol border elements, and (c) a latency associated with at least one of the second and third peered voice over Internet protocol border elements.

17. A method as defined in claim 16, wherein the modified session initiation protocol message comprises a session initiation protocol INVITE message.

18. A method as defined in claim 16, wherein the session initiation protocol message is received from a voice over Internet protocol user device before inserting the header field.

19. A method as defined in claim 16, wherein the call session control function server comprises a serving call session control function server.

* * * * *